(12) United States Patent
Ireland et al.

(10) Patent No.: US 6,265,966 B1
(45) Date of Patent: Jul. 24, 2001

(54) MARINE SECURITY SYSTEM

(76) Inventors: Brian L. Ireland, 59 Cherry Ct.;
Charles W. Main, Jr., 441 Cherry La.,
both of La Grange, KY (US) 40031

( * ) Notice: Subject to any disclaimer, the term of this patent is extended or adjusted under 35 U.S.C. 154(b) by 0 days.

(21) Appl. No.: 09/370,628

(22) Filed: Aug. 6, 1999

(51) Int. Cl.[7] .................................................. B60R 25/10
(52) U.S. Cl. .................. 340/426; 340/429; 340/568.1
(58) Field of Search ............................... 340/423.5, 426, 340/429, 568.1, 571

(56) References Cited

U.S. PATENT DOCUMENTS

| | | |
|---|---|---|
| 3,760,396 | 9/1973 | Haselton . |
| 3,764,971 | 10/1973 | Brobeck . |
| 3,980,847 | 9/1976 | Mines et al. . |
| 4,127,031 | 11/1978 | Barnes . |
| 5,051,744 | 9/1991 | Ewart . |
| 5,130,708 | 7/1992 | Boyden . |
| 5,319,698 | 6/1994 | Glidewell et al. . |
| 5,393,943 | 2/1995 | Furukawa et al. . |
| 5,512,874 | * 4/1996 | Poston .................................. 340/426 |
| 5,612,668 | * 3/1997 | Scott .................................... 340/426 |
| 5,777,551 | 7/1998 | Hess . |
| 5,801,615 | * 9/1998 | Su ..................................... 340/425.5 |

* cited by examiner

*Primary Examiner*—Edward Lefkowitz
(74) *Attorney, Agent, or Firm*—Dale J. Ream

(57) ABSTRACT

A security system for a vehicle comprises a sensor assembly which can be releasably mounted to a vehicle or to an item contained therein. The sensor assembly includes a sensing device that is actuated upon sensing a predetermined change in inertia relative to the assembly. The sensing device actuates a transmitter within the sensor assembly to transmit a signal upon detection of the predetermined level of inertial change. The security system further includes a receiver/transmitter unit mounted near the sensor assembly for receiving the transmitted signal and then transmitting an amplified signal to a remote station. The receiver/transmitter unit may be operatively connected to the horn or lights of the vehicle so as to foil a potential thief who presumably initiated the inertial change that activated the alarm. The remote station also includes audible and visual alarms for alerting a vehicle owner of the theft that is potentially in progress at the site of the vehicle.

16 Claims, 5 Drawing Sheets

MARINE SECURITY SYSTEM

BACKGROUND OF THE INVENTION

This invention relates generally to security systems and, more particularly, to a system which transmits an alarm signal upon sensing a change in the inertia of an article or vehicle to which a sensor assembly is attached.

Theft of vehicles or items stored therein is a recognized problem in our society. In recent times, boats kept at a marina, campground, hotel parking area, or residence have become a particular target for thieves. Expensive engine components, propellers, and fishing tackle are relatively easy to remove from the boat for use or resale by a thief. This problem is compounded at fishing competitions where dozens of boaters store their boats overnight in a central location without any type of security.

Various security systems have been proposed for detecting an unauthorized intrusion or other abnormal condition relative to a boat or other vehicle. However, a system having sensors that are easily attached to multiple locations on a boat or items stored therein and which cannot be subverted by a thief is still needed. Therefore, it is desirable to have a security system which alerts a boat owner when the inertia of a boat or a particular article stored therein is changed.

SUMMARY OF THE INVENTION

The security system according to the preferred embodiment of the present invention utilizes a plurality of sensor assemblies positioned at selected locations on a vehicle or on particular items stored therein. Each sensor assembly includes a device for sensing an acceleration or change in the inertia of the sensor assembly. A transmitter positioned within the sensor assembly is operatively connected to the sensing device and transmits a signal when a predetermined level of inertial change is detected. A switch for activating or deactivating the device is located inside its housing such that the device cannot be deactivated without first opening and thus activating an alarm. A slave transmitter/receiver unit is mounted in close proximity to the sensor assembly and receives the signal transmitted by a sensor assembly that has detected an inertial change. The slave transmitter/receiver unit may be coupled to the horn or lights of the vehicle and may activate these elements upon receipt of the signal. The signal is then amplified and transmitted to a remote station that may be located nearby or at a distance, such as at a hotel or residence of the vehicle owner. The remote station includes audible and visual alarms for alerting the vehicle owner regarding the potential theft of the protected vehicle or its contents.

Therefore, it is a general object of this invention to provide a security system which alerts a vehicle owner upon unauthorized movement of the vehicle or selected contents therein.

Another object of this invention is to provide a security system, as aforesaid, having a plurality of sensor assemblies which can be selectively positioned on vehicle components or articles.

Still another object of this invention is to provide a security system, as aforesaid, in which the sensor assemblies can detect accelerated movement of items to which they are attached.

Yet another object of this invention is to provide a security system, as aforesaid, in which each sensor assembly cannot be deactivated without first transmitting an alarm signal.

A further object of this invention is to provide a security system, as aforesaid, which activates a visual and audible alarm upon detection of intrusion.

A still further object of this invention is to provide a security system, as aforesaid, which can transmit an alarm signal to a vehicle owner at a remote location.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
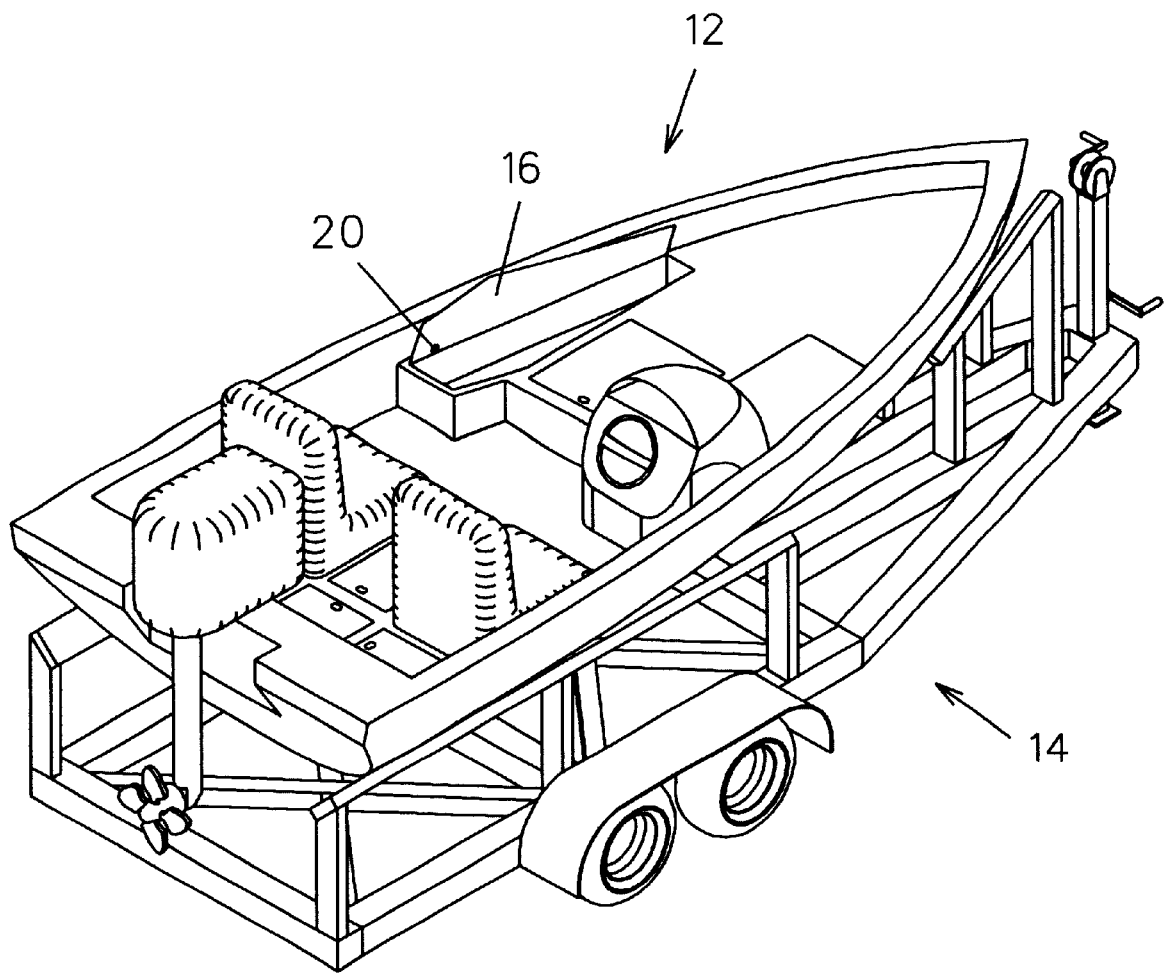
FIG. 1 is a perspective view of a boat equipped with a security system according to the present invention.
Figure 2:
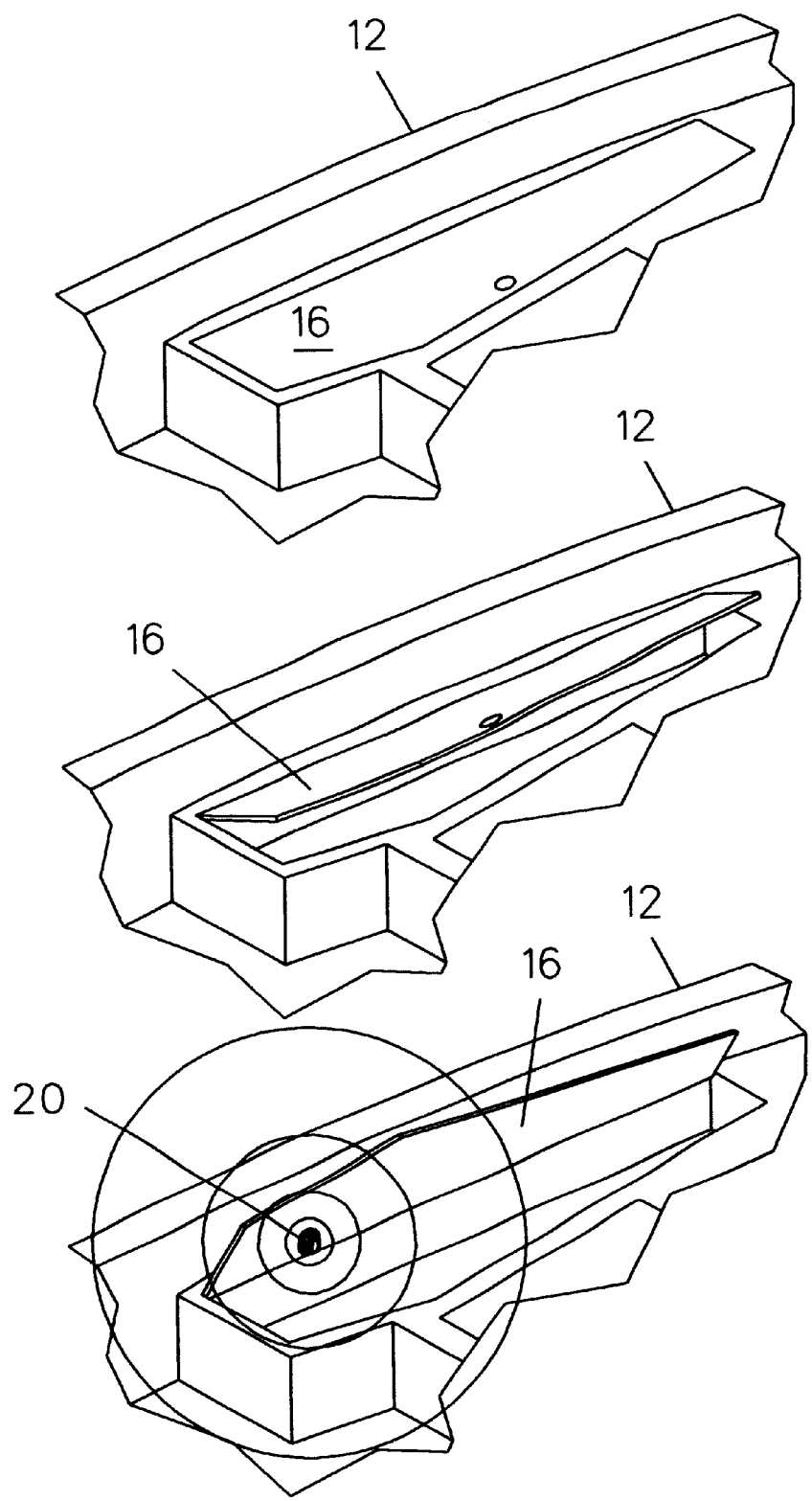
FIG. 2 is a perspective view of a compartment of the boat of FIG. 1 showing activation of an audible alarm upon the opening of the compartment door.

Turning now to the drawings, FIGS. 1 and 2 show a security system 10 according to the present invention having a security device 20 attached to the underside of a compartment door 16 of a vehicle. While a boat 12 and trailer 14 are illustrated in the drawings, it is understood that the individual vehicle to be protected could also be an automobile, camper, recreational vehicle, or the like. The security system 10 may include a plurality of security devices attached to selected locations on the vehicle or on articles stored within the vehicle.

Figure 3A:
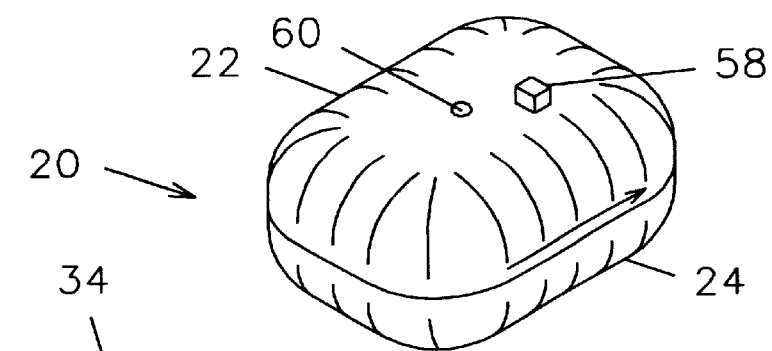
FIG. 3A is a perspective view of a security device in a closed position.
Figure 3A:
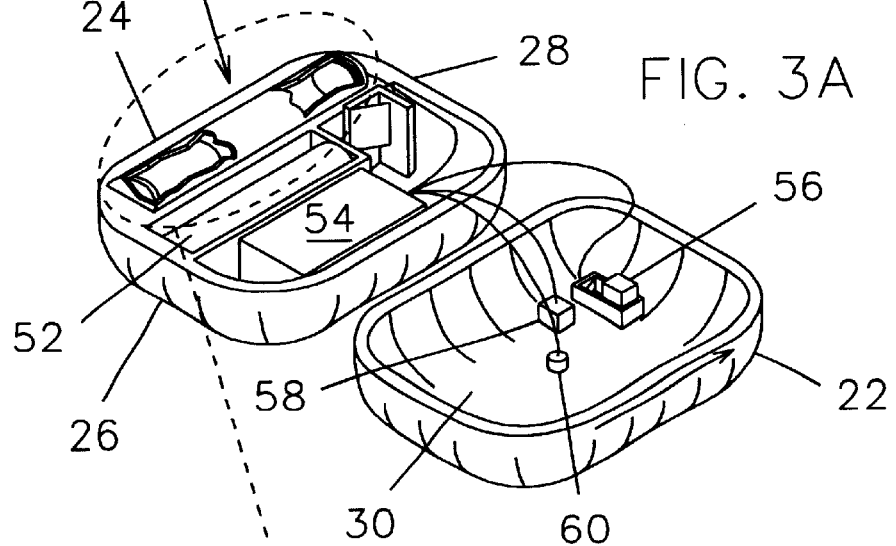
Figure 3B:
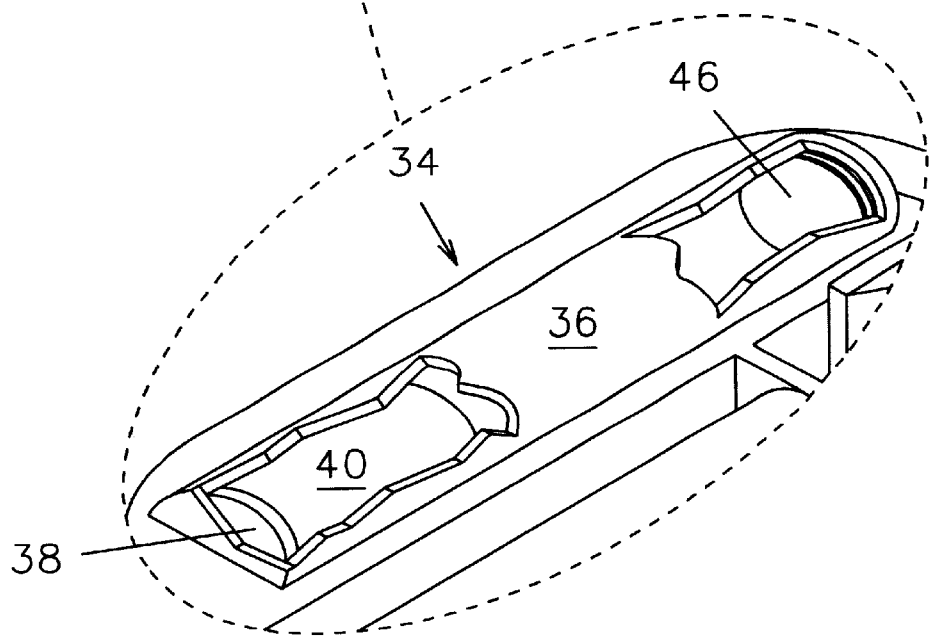
FIG. 3B is a perspective view of the device of FIG. 3A in an open position with an enlarged isolated view of the acceleration sensing mechanism.
Figure 4D:
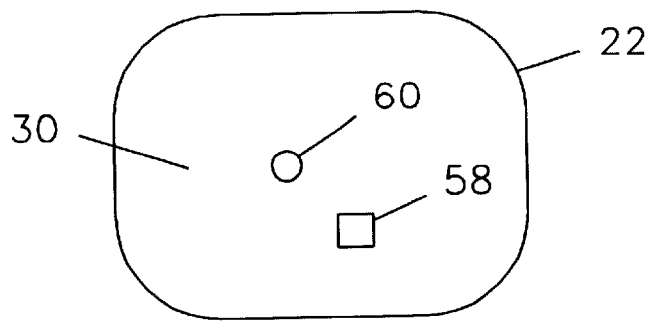
FIG. 4D is top view of the security device of FIG. 3A.
Figures 4B, 4C:
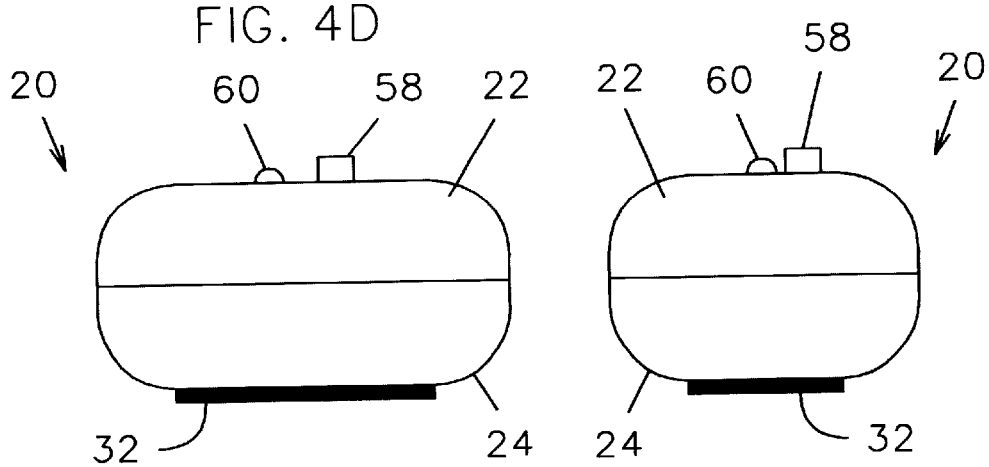
FIG. 4B is a side view of security device of FIG. 3A.
FIG. 4C is an end view of the security device of FIG. 3A.
Figure 4A:
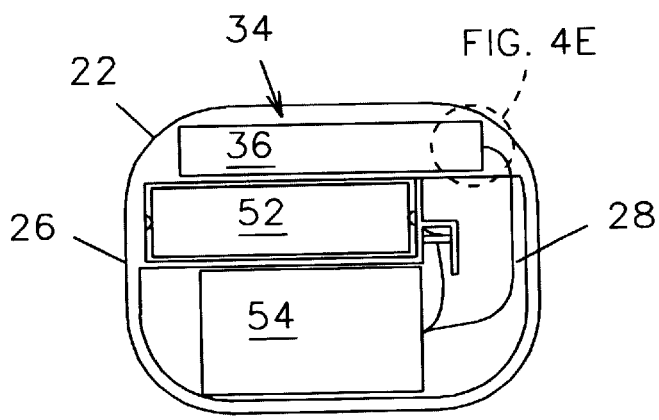
FIG. 4A is a top view of the bottom portion of the security device of FIG. 3B.

Each security device 20 includes a housing preferably molded from a lightweight, rigid material such as polyvinyl plastic, although metal or any other suitable material may also be used. The housing includes an upper portion 22 releasably coupled to a lower portion 24, each portion 22, 24 having an identical exterior configuration. Each portion 22, 24 includes first 26 and second 28 spaced apart end walls with an outer wall 30 extending between the end walls 26, 28. A chamber is formed between the upper 22 and lower 24 portions for housing the components of the security device 20, as more fully described below (FIGS. 3A and 3B). A hook-and-loop fastening member 32, such as VELCRO® or other suitable fastening means, is fixedly attached to the outer wall 30 of the lower portion 24 of the housing (FIGS. 4B and 4C). A complementary fastening member (not shown) may be adhesively attached to a desired position on or in a vehicle such that the security device 20 may be releasably attached to the vehicle.

The security device 20 includes an acceleration sensor assembly 34. The sensor assembly 34 includes a cylindrical casing 36 formed of a non-magnetic material mounted between first 26 and second 28 ends of the lower portion 24 of the housing (FIG. 3B). A magnet 38 is fixedly mounted within the casing 36 adjacent the first end 26 of the lower housing portion 24. The sensor assembly 34 further includes a weight 40 or inertia member made of a magnetic material such as iron that is slidably mounted within the casing 36 and is freely movable in the longitudinal direction of the casing 36.

Figure 4E:
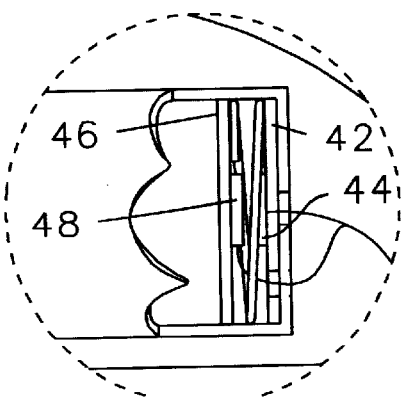
FIG. 4E is an enlarged isolated view showing the configuration of the electrodes within the acceleration sensor casing.

A first plate 42 is fixedly mounted within the casing 36 adjacent the second end 28 of the lower housing portion 24 (FIG. 4E). A first electrode 44 is fixedly attached to the first plate 42. A second plate 46 displaced from the first plate 42 is freely movable in the longitudinal direction of the casing 36. A second electrode 48 is fixedly attached to the second plate 46. A compression spring 50 is sandwiched between first 26 and second 28 plates and coupled thereto such that the second electrode 48 contacts the first electrode 44 upon a compression of the spring 50. It is understood that the spring 50 is small and minimally resistant to contact by the weight 40.

The security device 20 further includes a battery 52 and a transmitter 54 mounted within the lower portion 24 of the housing. An on/off switch 56 is mounted on the interior of the upper housing portion 22 (FIG. 3B) and is coupled to the battery 52 with a wire. The on/off switch 56 is also coupled to the first electrode 44 of the sensor assembly 34 with a wire which, in turn, is coupled to the transmitter 54 with a wire. A reset button 58 extends through the outer wall 30 of the upper housing portion 22 and is coupled to the transmitter 54 with a wire. A light emitting diode (LED) 60 also extends through the outer wall 30 of the upper housing portion 22 and is connected to the battery 52 for indicating the strength of the battery power.

In operation, the weight 40 is magnetically attracted to the magnet 38 within the casing 36 of the acceleration sensor assembly 34 and is held in contact therewith so long as inertial forces are not significantly changed. However, the magnetic attraction between the magnet 38 and weight 40 will be broken upon a predetermined change in orientation or change in acceleration of the security device 20. Preferably, the magnetic coupling is broken upon a 25 or 30 degree inclination of a boat compartment door 16 to which the security device 20 is attached. It will be appreciated that the degree of inclination required to break the magnetic attraction is dependent upon the strength of the magnet or the size of the weight 40 used in the device. The rate of change in acceleration necessary to break the magnetic attraction is regulated in a similar manner.

When an external force sufficient to break the magnetic attraction between the magnet 38 and weight 40 is applied, the weight 40 is allowed to move freely within the casing 36 until it bears against the second plate 46. The spring 50 is thus compressed until the second electrode 48 contacts the first electrode 44. When the on/off switch 56 is in the "on" position, electric current is communicated from the battery 52 to the first electrode 44 and, upon contact between the first 44 and second 48 electrodes, to the transmitter 54. The transmitter 54 then transmits a signal until the reset button 58 is depressed or until the on/off switch 56 is placed in the "off" position. When the external force exerted upon the security device 20 is sufficiently decreased or removed, the magnet 38 will again attract the weight 40 into contact therewith. The compression spring 50 further urges the weight 40 in the direction of the magnet 38.

Figure 5:
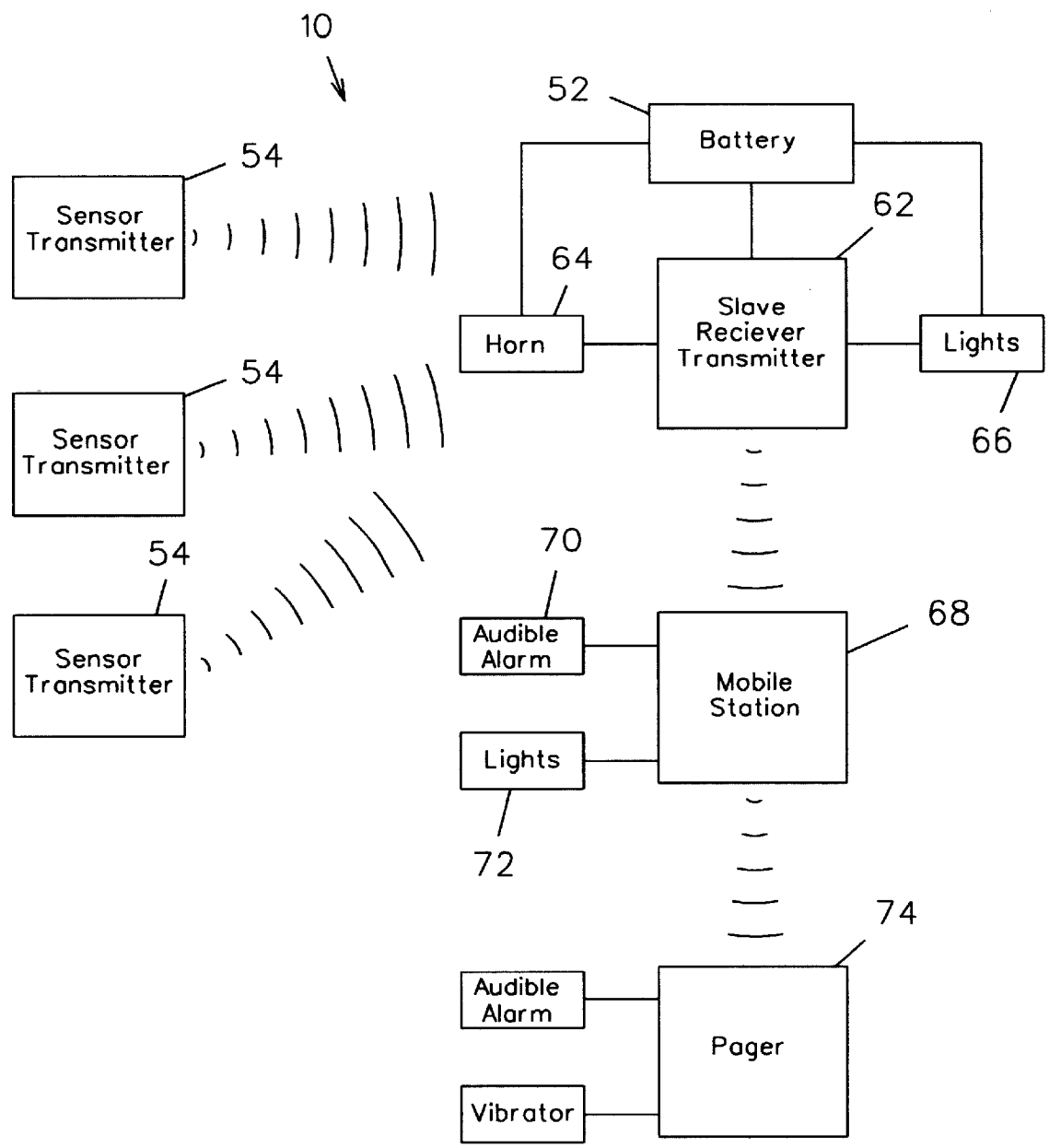
FIG. 5 is a block diagram of the security system according to the present invention.

With reference to FIG. 5, the security system 10 further includes a slave receiver/transmitter unit 62 housed in or near the vehicle being protected by one or more security devices 20. The receiver/transmitter unit 62 receives a signal transmitted from the transmitter 54 of a security device 20 and then transmits an amplified alarm signal through the atmosphere.

The receiver/transmitter unit 62 may be operatively coupled to the horn 64 or lights 66 of the vehicle so as to activate them upon receipt of a signal from a security device 20. The alarm signal transmitted by the receiver/transmitter unit 62 is received by a portable remote station 68 which may be located nearby, such as in a hotel, or even several miles away, such as in the owner's home. The portable remote station 68 includes audible 70 and visual 72 alarms which are activated upon receipt of a signal from the receiver/transmitter unit 62. These alarms are capable of alerting the vehicle owner of a possible intrusion relative to the protected vehicle. The remote station 68 can also transmit a signal to a pager 74 for alerting a vehicle owner who has traveled away from the remote receiver 68. It should be noted that each signal may be encoded prior to transmission and decoded upon receipt using encoding techniques known in the art.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A security system for a vehicle, comprising:

a sensor assembly including structure for releasably mounting said sensor assembly to a vehicle and including a sensing device that is actuated by a predetermined level of inertial change relative to said sensor assembly and including a transmitter for transmitting a signal upon sensing said predetermined level of inertial change;

a receiver mounted on a corresponding vehicle for receiving said transmitted signal from said sensor assembly and generating an output signal;

a slave transmitter operatively coupled to said receiver for receiving said output signal and generating an alarm signal upon receipt of said output signal, said slave transmitter including a transmitter for transmitting said alarm signal; and a remote station including an alarm and a receiver for receiving said alarm signal, said remote station activating said alarm upon receipt of said alarm signal, wherein said sensing device comprises:

a housing having first and second longitudinally opposed end walls and structure defining an interior space;

a weight slidably mounted within said interior space for movement between said first and second end walls;

a magnet on said first end wall within said interior space for attracting said weight, said weight moveable between a first position in contact with said magnet and a second position displaced from said magnet;

first and second spaced apart electrodes positioned at said second end of said housing;

a power supply positioned within said interior space of said housing, said power supply providing electrical current for energizing said second electrode; and said first and second electrodes electrically connected together when said weight is in said second position.

2. A security system as in claim 1 wherein said vehicle is a boat.

3. A security system as in claim 1 wherein said weight is moved from said first position to said second position upon exertion of a force upon said sensor assembly sufficient to overcome said attraction between said weight and said magnet.

4. A security system as in claim 1 wherein said transmitter is coupled to said first electrode; and said sensing device includes a switch positioned within said interior space for selectively delivering said electrical current to said second electrode, said transmitter transmitting a signal when said switch is positioned to deliver current to said second electrode and said weight is in said second position.

5. A security system as in claim 1 wherein said receiver is operatively coupled to a horn of said vehicle such that said horn is actuated upon receipt of said transmitted signal.

6. A security system as in claim 1 wherein said receiver is operatively coupled to the lights of said vehicle such that said lights are activated upon rceipt of said transmitted signal.

7. A security system as in claim 1 wherein said remote station alarm is an audible alarm.

8. A security system as in claim 1 wherein said remote station alarm is a visual alarm.

9. A security system as in claim 1 wherein said remote station transmits an alarm signal to a pager.

10. A security device for detecting an inertial change indicative of movement of an item, comprising:

a housing having first and second oppositely disposed end walls and structure defining an interior space;

a weight slidably mounted within said interior space for movement between said first and second end walls;

a magnet on said first end wall within said interior space for magnetically attracting said weight;

first and second spaced apart electrodes positioned at said second end of said housing;

a power supply positioned within said interior space of said housing, said power supply providing electrical current for energizing said second electrode;

a switch positioned within said interior space for selectively delivering said current to said second electrode such that said first and second electrodes are electrically connected together upon a movement of said weight from said first end to said second end.

11. A security device as in claim 10 wherein said weight is movable between a first position in con act with said magnet and a second position displaced from said magnet upon exertion of a force upon said security device sufficient to overcome said attraction between said weight and said magnet.

12. A security device as in claim 11 further comprises a spring positioned within said interior space between said first and second electrodes, said spring extending to displace said first electrode from said second electrode when said weight is in said first position, said spring compressing such that said first electrode contacts said second electrode when said weight is in said second position.

13. A security device as in claim 10 includes a transmitter operatively coupled to said first electrode for transmitting a signal when said switch is positioned to deliver current to said second electrode and said first and second electrodes are electrically connected together.

14. A security device as in claim 10 includes means for mounting said device to a vehicle.

15. A security device as in claim 10 wherein said housing includes a first portion releasably coupled to a second portion.

16. A security device as in claim 10 includes means for indicating the strength of said power supply.

* * * * *